(12) United States Patent

Danek

(10) Patent No.: US 12,637,141 B1

(45) Date of Patent: May 26, 2026

(54) STEERING DAMPER MOUNT TO REDUCE SHAFT LOAD

(71) Applicant: Fox Factory, Inc., Duluth, GA (US)

(72) Inventor: Magnus Lars Danek, Stockholm (SE)

(73) Assignee: Fox Factory, Inc.

( * ) Notice: Subject to any disclaimer, the term of this patent is extended or adjusted under 35 U.S.C. 154(b) by 0 days.

(21) Appl. No.: 19/228,145

(22) Filed: Jun. 4, 2025

(51) Int. Cl.
   B62D 7/22 (2006.01)

(52) U.S. Cl.
   CPC ...................................... B62D 7/22 (2013.01)

(58) Field of Classification Search
   CPC ............................... B62D 7/22; B60R 21/207
   See application file for complete search history.

(56) References Cited

U.S. PATENT DOCUMENTS

| | | | | |
|---|---|---|---|---|
| 3,109,668 | A * | 11/1963 | Sampietro | B62D 7/22 |
| | | | | 280/89 |
| 3,171,298 | A * | 3/1965 | Henry-Biabaud | B62D 6/02 |
| | | | | 280/90 |
| 5,244,226 | A * | 9/1993 | Bergh | B62D 13/04 |
| | | | | 280/426 |
| 5,511,817 | A * | 4/1996 | Kasahara | B60G 3/20 |
| | | | | 267/276 |
| 7,810,823 | B2 * | 10/2010 | Van Mill | A01B 69/003 |
| | | | | 280/81.6 |
| 8,070,172 | B1 * | 12/2011 | Smith | B62K 5/05 |
| | | | | 280/124.135 |

| | | | | |
|---|---|---|---|---|
| 8,256,780 | B2 * | 9/2012 | Shibuya | B60G 3/18 |
| | | | | 280/93.51 |
| 8,474,842 | B2 * | 7/2013 | Shibuya | B60G 3/20 |
| | | | | 280/93.51 |
| 10,328,971 | B1 * | 6/2019 | Shepherd | B60D 1/245 |
| 10,946,925 | B2 * | 3/2021 | Athanasiou | B62K 21/18 |
| 11,332,190 | B1 * | 5/2022 | Shepherd | F16F 9/0209 |
| 11,643,140 | B2 * | 5/2023 | Gottschalk | B62D 9/00 |
| | | | | 180/408 |
| 12,503,160 | B2 * | 12/2025 | Skinner | B62D 7/224 |
| 2008/0202827 | A1 * | 8/2008 | Thiers | B62K 21/005 |
| | | | | 180/6.24 |
| 2010/0219600 | A1 * | 9/2010 | Dada | B62D 3/12 |
| | | | | 280/124.135 |
| 2015/0266507 | A1 * | 9/2015 | Westnedge | B62D 13/06 |
| | | | | 280/93.502 |
| 2019/0002017 | A1 * | 1/2019 | Fay | B62D 5/26 |

(Continued)

FOREIGN PATENT DOCUMENTS

| | | | | |
|---|---|---|---|---|
| AT | 524955 | B1 * | 11/2022 | B62D 17/00 |
| CA | 2728388 | A1 * | 7/2011 | A63C 17/0046 |

(Continued)

*Primary Examiner* — Nicole T Verley

(74) *Attorney, Agent, or Firm* — Perilla Knox & Hildebrandt LLP; Kenneth A. Knox

(57) ABSTRACT

Described are embodiments of rotatable link-based mounting systems for various dampers such as steering dampers. In one example, a steering damper includes a housing having a longitudinal centerline. The steering damper further includes a mounting system coupled to the housing. The mounting system includes at least two link members rotatably coupled to the housing. Longitudinal centerlines of the at least two link members intersect one another at a defined location on the longitudinal centerline of the housing to collectively create an instantaneous center of rotation for the housing at the defined location.

20 Claims, 3 Drawing Sheets

(56)                    References Cited

U.S. PATENT DOCUMENTS

| 2019/0161114 | A1* | 5/2019 | Yamazaki | B62D 7/16 |
| 2021/0206429 | A1* | 7/2021 | Liu | B62D 7/228 |
| 2023/0001759 | A1* | 1/2023 | Doerksen | B60P 3/007 |
| 2023/0106423 | A1* | 4/2023 | Wang | B62D 7/1545 |
| | | | | 180/445 |
| 2023/0110345 | A1* | 4/2023 | Preijert | B62D 5/006 |
| | | | | 74/492 |
| 2025/0096451 | A1* | 3/2025 | Park | H01Q 1/12 |

FOREIGN PATENT DOCUMENTS

| CN | 113044112 | A | * | 6/2021 | B62D 3/12 |
| CN | 118323310 | A | * | 7/2024 | B62K 21/08 |
| CN | 120003624 | A | * | 5/2025 | B62K 21/08 |
| CN | 120288169 | A | * | 7/2025 | B62K 25/08 |
| DE | 2710651 | A | * | 9/1978 | |
| DE | 102020208140 | A1 | * | 1/2021 | B62D 7/22 |
| EP | 1707483 | A1 | * | 10/2006 | F16F 9/145 |
| EP | 1775209 | A2 | * | 4/2007 | B62K 21/08 |
| EP | 3192730 | A1 | * | 7/2017 | B62J 45/4151 |
| GB | 2622361 | A | * | 3/2024 | F16H 55/24 |
| JP | 2004286128 | A | * | 10/2004 | F04C 9/002 |
| JP | 2009113679 | A | * | 5/2009 | |
| JP | 2010053958 | A | * | 3/2010 | |
| JP | 2015134555 | A | * | 7/2015 | |
| JP | 6534907 | B2 | * | 6/2019 | B62D 3/12 |
| JP | 7344006 | B2 | * | 9/2023 | B62D 7/16 |
| WO | WO-8807953 | A1 | * | 10/1988 | B62D 5/09 |
| WO | WO-2013119242 | A1 | * | 8/2013 | F16H 61/2807 |
| WO | WO-2017145271 | A1 | * | 8/2017 | A47C 7/004 |

* cited by examiner

STEERING DAMPER MOUNT TO REDUCE SHAFT LOAD

BACKGROUND

A steering damper, also known as a steering stabilizer, is a component that reduces the side-to-side motion of a vehicle's steering system. Steering dampers thus improve handling, reduce driver fatigue, and enhance stability, particularly on rough terrain or at high speeds. In damper assemblies, minimizing bending or shearing loads on the shaft and bushings is critical. Side loads on the shaft can increase friction, accelerate wear, and potentially damage or cause failure of internal components. Controlling friction is especially important in steering dampers, as excessive resistance can negatively impact steering performance. Side loading at the bushing-shaft interface not only causes wear, but can also overload and compromise other parts of the damper assembly.

BRIEF SUMMARY

The present disclosure is directed to embodiments of rotatable link-based mounting systems for various dampers such as steering dampers. The rotatable mounting systems each create an instantaneous center of rotation or a "virtual pivot point" for a damper housing at a certain location on or approximately on its longitudinal centerline. The rotatable mounting systems include at least two links or link members rotatably coupled to one or more sides of a damper housing in many cases. The rotatable links can collectively create an instantaneous center of rotation or virtual pivot point for a damper housing at a certain location on its longitudinal centerline, which is aligned with a longitudinal centerline of a damper shaft or piston shaft concentrically positioned within the damper housing in many examples. The instantaneous center of rotation created by the rotatable links allows for axial loads applied to the damper housing and the shaft to be axially aligned along or close to their shared longitudinal centerline, thereby minimizing or eliminating any bending load on such components and other damper components. By reducing the bending loads on such components, the rotatable links also reduce friction between and overloading of these components, which can improve the overall performance and longevity of any damper (e.g., a steering damper) having a rotatable mounting system described herein.

Aspects and advantages of embodiments of the present disclosure will be set forth in part in the following description or can be learned from the description or through practice of the embodiments. Other aspects and advantages of embodiments of the present disclosure will become better understood with reference to the appended claims and the accompanying drawings, all of which are incorporated in and constitute a part of this specification. The drawings illustrate example embodiments of the present disclosure and, together with the description, serve to explain the related concepts of the present disclosure.

According to one example embodiment, a steering damper includes a housing having a longitudinal centerline. The steering damper further includes a mounting system coupled to the housing. The mounting system includes at least two link members rotatably coupled to the housing. Longitudinal centerlines of the at least two link members intersect one another at a defined location on the longitudinal centerline of the housing to collectively create an instantaneous center of rotation for the housing at the defined location.

According to another example embodiment, a steering damper includes a housing having a longitudinal centerline. The steering damper further includes a mounting system coupled to the housing. The mounting system includes a first link member rotatably coupled to a first side of the housing. The mounting system further includes at least two second link members rotatably coupled to a second side of the housing that is different from the first side of the housing. A longitudinal centerline of the first link member intersects longitudinal centerlines of the at least two second link members at a defined angle at a defined location on the longitudinal centerline of the housing to collectively create an instantaneous center of rotation for the housing at the defined location.

BRIEF DESCRIPTION OF THE DRAWINGS

Many aspects of the present disclosure can be better understood with reference to the following figures. The components in the figures are not necessarily to scale, with emphasis instead being placed upon clearly illustrating the concepts of the disclosure. Moreover, repeated use of reference characters or numerals in the figures is intended to represent the same or analogous features, elements, or operations across different figures. Repeated description of such repeated reference characters or numerals is omitted for brevity.

DETAILED DESCRIPTION

Various embodiments are described herein for a steering damper mount assembly to reduce shaft loads. It is important to minimize any bending or shearing loads on a shaft and shaft bushings in all types of dampers as such loads increase friction between damper components, which can damage or even cause some components to fail completely. It is critically important to minimize friction between components in a steering damper where the friction can affect the steering performance of a vehicle, risking the safety of the vehicle operator and others.

In particular, it is important to minimize friction between components in steering dampers and other dampers having a mounting location that is laterally offset form a longitudinal centerline of the damper and the damper's shaft. Many steering dampers have a housing with a mounting location that is laterally offset some distance from a longitudinal centerline of the housing. A problem with such dampers is that the mounting location of the housing is also laterally offset the same distance from a longitudinal centerline of the damper's shaft, which creates a bending load in the shaft during compression and rebound. The bending load is relatively high and increases friction between the shaft and bushings within the damper housing, as well as overloads these and other damper components to the point of damage or complete failure (e.g., fracture, rupture, separation, seizure, fragmenting).

The embodiments described herein provide a solution to the aforementioned problems associated with dampers having laterally offset mounting locations in the form of a steering damper having a mounting system that creates an instantaneous center of rotation or a "virtual pivot point" for the damper at a certain location on its longitudinal centerline. The mounting system includes at least two links or link members rotatably coupled to one or more sides of a damper housing in many cases. The rotatable links can collectively create an instantaneous center of rotation or virtual pivot point for the damper housing at a certain location on its longitudinal centerline, which is also a longitudinal centerline of a damper shaft or piston shaft that is concentrically positioned within the damper housing in many examples.

The instantaneous center of rotation created by the rotatable links of damper mounting systems described herein allows for axial loads applied to the housing and the shaft to be axially aligned along or close to their shared longitudinal centerline, thereby minimizing or eliminating any bending load on such components and other damper or vehicle components. By reducing the bending loads on such components, the rotatable links of the damper mounting systems described herein also reduce friction between and overloading of these components, which can improve the overall performance and longevity of any damper (e.g., a steering damper) having such a rotatable mounting system.

Figures 1A, 1B:
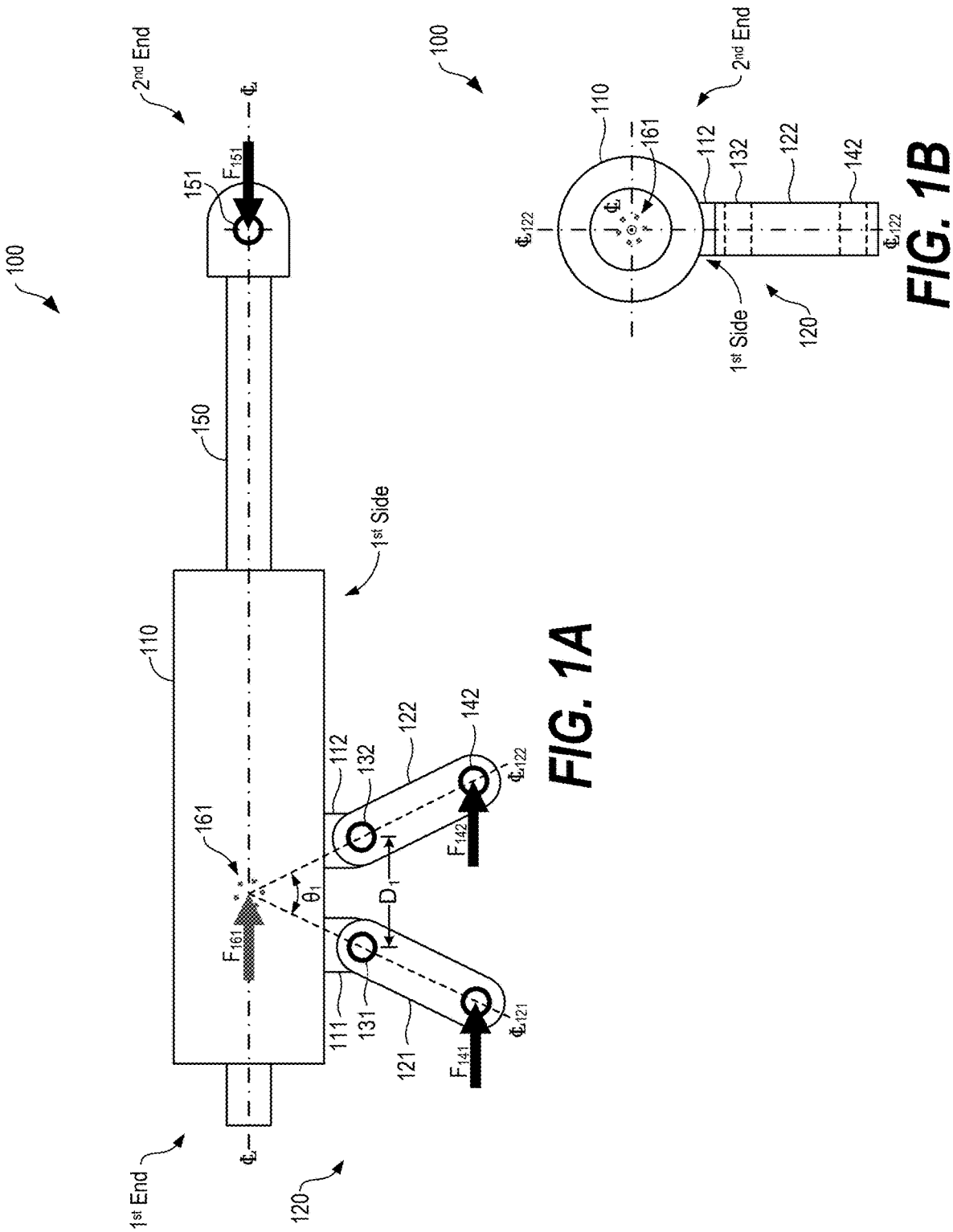
FIG. 1A illustrates a front view of an example damper in accordance with various aspects and embodiments of the present disclosure.
FIG. 1B illustrates a side view of the example damper shown in FIG. 1A in accordance with various aspects and embodiments of the present disclosure.

For context, FIGS. 1A-1B illustrate different views of an example damper 100 in accordance with various aspects and embodiments of the present disclosure. FIG. 1A illustrates a front view of the damper 100 and FIG. 1B illustrates a side view of the damper 100.

The damper 100 is illustrated as a representative example of a steering damper including a rotatable mounting system rotatably coupled to a housing of the damper 100 to reduce or eliminate side loading, friction, and overloading on various components of the damper 100. The concepts described herein can be extended to use with a range of dampers and rotatable mounting systems of different types, styles, components, and configurations, however. The damper 100 is not drawn to any particular scale or size in the drawings. The shape, size, proportion, and other characteristics of the damper 100 can vary as compared to that shown. For example, the damper 100 can accommodate larger (e.g., longer, thicker, wider) or smaller (e.g., shorter, thinner, narrower) rotatable link members forming the rotatable mounting system rotatably coupled to the housing of the damper 100, and other variations are within the scope of the examples described herein.

Additionally, one or more of the parts or components of the damper 100, as illustrated in the drawings and described herein, can be omitted in some cases. The damper 100 can also include other parts or components that are not illustrated. In many cases, the rotatable mounting system of the damper 100 can be rotatably coupled to a relatively rigid or static structure or member (not illustrated) such as a frame or mount member of a vehicle chassis. For instance, the rotatable mounting system of the damper 100 can be rotatably coupled to such a structure or member to implement the damper 100 as described in one or more examples herein. In some cases, the rotatable mounting system of the damper 100 can be rotatably coupled to a linear steering damper such as a through-rod type or another type of linear steering damper that can be implemented on a motorcycle or an automobile (e.g., car, truck, off-road vehicle).

The damper 100 can be embodied and implemented in many cases as a steering damper including a rotatable mounting system rotatably coupled to a housing of the damper 100. The damper 100 as described herein can reduce or eliminate side loading, friction, and overloading on various components of the damper 100. For instance, the damper 100 can be embodied and implemented in many cases as a steering damper having a rotatable mounting system the includes at least two links rotatably coupled to one or more sides of a housing of the damper 100.

The links can collectively create an instantaneous center of rotation for the damper's housing at a defined location on or close to a longitudinal centerline of the housing to align axial loads applied to the damper 100 with the longitudinal centerline of its housing when such loads are applied to the damper 100 as described further herein. By aligning axial loads applied to the damper 100 along the longitudinal centerline of its housing, the links can minimize or eliminate any bending load on various components of the damper 100 during operation, thereby reducing friction between and overloading of these components and improving the overall performance and longevity of the damper 100.

Among other components, the damper 100 in the example shown includes a housing 110 having a first housing mount 111 and a second housing mount 112 (or "housing mounts 111, 112") extending from a first side ($1^{st}$ Side) of the housing 110. The damper 100 further includes a mounting system 120 rotatably coupled to housing mounts 111, 112 of the housing 110 and a shaft 150 concentrically positioned at least partly within the housing 110.

One or both of the housing mounts 111, 112 can be formed into (e.g., integrated into) or otherwise coupled to the $1^{st}$ Side of the housing 110. For instance, one or both of the housing mounts 111, 112 can be an integral component of the housing 110, machined into the housing 110, welded to the housing 110, fastened to the housing 110, or otherwise secured to the housing 110 in various cases. In some examples, one or both of the housing mounts 111, 112 may be a component that is embodied with or included in the mounting system 120. For instance, the mounting system 120 may be embodied as a modular unit that includes the housing mounts 111, 112 for mounting such a unit to the housing 110 in some cases.

When concentrically positioned at least partly within the housing 110 as shown, the shaft 150 and the housing 110 share a longitudinal centerline ($Ȼ$) extending from a first end ($1^{st}$ End) to a second end ($2^{nd}$ End) of the damper 100. The shaft 150 is configured and operable for translational movement along the longitudinal centerline $Ȼ$ of the housing 110 during operation (e.g., during compression and rebound). For instance, when an axial force ($F_{151}$) is applied to a rotatable connector 151 located on the shaft 150 at the $2^{nd}$ End of the damper 100 as shown, the shaft 150 is configured and operable to move linearly along the longitudinal centerline $Ȼ$ of the housing 110.

In some examples, the rotatable connector 151 can be embodied as a ball bearing or other rotatable connector that is configured and operable for rotation within a single plane. In other examples, the rotatable connector 151 can be embodied as a ball joint or other rotatable connector that is configured and operable for rotation within and across multiple planes. In the example shown, the rotatable connector 151 is embodied as a ball bearing.

The housing mounts 111, 112 each extend from a same side (e.g., the 1st Side) of the housing 110 relative to the longitudinal centerline ℄ of the housing 110 in this example. Each of the housing mounts 111, 112 also extends from the housing 110 at a different defined longitudinal location relative to the longitudinal centerline ℄ of the housing 110 in this example. The housing mount 111 extends from the housing 110 at a first longitudinal location relative to the longitudinal centerline ℄ of the housing 110 and the housing mount 112 extends from the housing 110 at a second longitudinal location relative to the longitudinal centerline ℄ of the housing 110. The first and second longitudinal locations are different and separated by a linear distance ($D_1$) relative to the longitudinal centerline ℄ of the housing 110 as illustrated in this example.

The mounting system 120 can include at least two link members rotatably coupled to one or more sides of the housing 110. In the example shown, the mounting system 120 includes a first link member 121 and a second link member 122 (or "link members 121, 122") rotatably coupled to the housing mounts 111, 112, respectively. The link members 121, 122 can each include at least one rotatable connector located at one or more of its ends. For instance, the link members 121, 122 can each include at least one rotatable connector coupled to or integrated into one or more of its ends. In this example, each of the link members 121, 122 includes a rotatable connector located at each of its distal ends. For instance, the link member 121 includes a first rotatable connector 131 and a second rotatable connector 141 located approximately at or adjacent its distal ends and the link member 122 includes a first rotatable connector 132 and a second rotatable connector 142 located approximately at or adjacent its distal ends as shown. In some examples, one or more of the rotatable connectors 131, 132, 141, 142 can be embodied as a rotational bearing, a bushing, a rubber bushing, a spherical ball joint, a ball bearing, or any other bearing that can only rotate in one plane (e.g., single degree-of-freedom). When the damper 100 is fabricated with two link members 121, 122 as illustrated in FIGS. 1A-1B, each of the rotatable connectors 131, 132, 141, 142 can be embodied as a bearing rotatable only in one plane to control rotation of the housing 110. In another example or application of the damper 100, one or more of the rotatable connectors 131, 132, 141, 142 may be embodied as a ball joint or other rotatable connector that can rotate within and across multiple planes. All embodiment variations of the damper 100 described herein are envisioned and included within the scope of the present disclosure.

Although not illustrated, in many cases the mounting system 120 can be rotatably coupled to a relatively rigid or static structure or member such as a frame or mount member of a vehicle chassis in many cases. For instance, the rotatable connectors 141, 142 of the link members 121, 122, respectively, can be rotatably coupled to such a structure or member.

The link members 121, 122 are each rotatably coupled to a same side (e.g., the 1st Side) of the housing 110 relative to the longitudinal centerline ℄ of the housing 110 in this example. Each of the link members 121, 122 is also rotatably coupled to the housing 110 at a different defined longitudinal location relative to the longitudinal centerline ℄ of the housing 110 in this example. The rotatable connector 131 of the link member 121 is rotatably coupled to the housing mount 111 at a first longitudinal location relative to the longitudinal centerline ℄ of the housing 110 and the rotatable connector 132 of the link member 122 is rotatably coupled to the housing mount 112 at a second longitudinal location relative to the longitudinal centerline ℄ of the housing 110. The first and second longitudinal locations are different and separated by the linear distance $D_1$ relative to the longitudinal centerline ℄ of the housing 110 as illustrated in this example.

The link members 121, 122 are each rotatable within a single or same plane relative to one another in this example. For instance, the rotatable connectors 131, 132 of the link members 121, 122, respectively, can each be embodied as or include a ball bearing that is rotatably coupled to the housing mounts 111, 112, respectively, of the housing 110. The ball bearings can allow for single plane or same plane rotation of their corresponding link members 131, 132 relative to one another about respective pivot points of the ball bearings. For example, the ball bearings can allow for rotation of their corresponding link members 131, 132 about respective pivot points of the ball bearings and within a plane shared by each of the longitudinal centerline ℄ of the housing 110, a longitudinal centerline $℄_{121}$ of the link member 121, and a longitudinal centerline $℄_{122}$ of the link member 122.

In some examples, either or both of the link members 121, 122 can be rotatable within and across multiple or different planes relative to one another. For instance, either or both of the rotatable connectors 131, 132 of the link members 121, 122, respectively, can be embodied as or include a ball joint that is rotatably coupled to the housing mounts 111, 112, respectively, of the housing 110 in some cases. The ball joints can allow for rotation of their corresponding link members 131, 132 relative to one another about respective pivot points of the ball joints. For example, the ball joints can allow for rotation of their corresponding link members 131, 132 about respective pivot points of the ball joints, as well as across and within one or more planes shared by the longitudinal centerline ℄ of the housing 110 and at least one of the longitudinal centerline $℄_{121}$ of the link member 121 or the longitudinal centerline $℄_{122}$ of the link member 122.

The longitudinal centerline $℄_{121}$ of the first link member 121 and the longitudinal centerline $℄_{122}$ of the second link member 122 can intersect one another at a defined intersect angle ($\theta_1$) at a certain location on the longitudinal centerline ℄ of the housing 110 in many examples. For instance, whether the damper 100 is in an operating mode or a non-operating mode, the link members 121, 122 can be positioned or rotated about the housing mounts 111, 112, respectively, such that their respective longitudinal centerlines $℄_{121}$, $℄_{122}$ intersect one another at an intersect angle $\theta_1$ at a certain location on the longitudinal centerline ℄ of the housing 110. In the example shown, the link members 121, 122 can be positioned or rotated such that their respective longitudinal centerlines $℄_{121}$, $℄_{122}$ intersect one another at the intersect angle $\theta_1$ at some location on the longitudinal centerline ℄ of the housing 110 to collectively create an instantaneous center of rotation 161 (or "ICR 161") for the housing 110 at such a location on the longitudinal centerline of the housing 110.

The ICR 161 can be designed, embodied, and implemented as a virtual pivoting point that can be created during operation of the damper 100 on or close to the longitudinal centerline ℄ of the housing 110. The link members 121, 122 can create the ICR 161 during operation of the damper 100 to align the longitudinal centerline ℄ of the housing 110 with both the axial force $F_{151}$ applied to the rotatable connector 151 and an equal and opposite axial force ($F_{161}$)

that can be functionally or effectively formed and applied at the ICR 161 by way of the link members 121, 122 as shown.

For instance, the link members 121, 122 can create the ICR 161 during operation of the damper 100 to functionally or effectively transfer an offset force ($F_{141}$) applied to the rotatable connector 141 and an offset force ($F_{142}$) applied to the rotatable connector 142 to the longitudinal centerline $\mathcal{C}$ of the housing 110 and further combine such offset forces $F_{141}$, $F_{142}$ to form and apply the axial force $F_{161}$ at the ICR 161 as shown. By aligning the offset forces $F_{141}$, $F_{142}$ along the longitudinal centerline $\mathcal{C}$ of the housing 110 to form and apply the axial force $F_{161}$ at the ICR 161, the link members 121, 122 can minimize or eliminate any bending load on various components of the damper 100 during operation, thereby reducing friction between and overloading of these components and improving the overall performance and longevity of the damper 100. The ICR 161 can allow the damper 100 to function as if the rotatable connector 151 was located inside the housing 110, thereby significantly reducing or eliminating any bending torque on the shaft 150 and other components of the damper 100 compared to existing steering dampers. The ICR 161 may not remain exactly on the longitudinal centerline $\mathcal{C}$ of the housing 110 for an entire operating duration of the damper 100. Instead, the ICR 161 may repeatedly align with and then move slightly away from the longitudinal centerline $\mathcal{C}$ of the housing 110 during operation of the damper 100.

The link members 121, 122 can be embodied such that they each have the same or similar geometry, dimensions, and material in many examples. In some cases, one of the link members 121, 122 can be embodied such that it has at least one of a different geometry, dimension, or material relative to the other link member. In the example shown, each of the link members 121, 122 have the same or similar geometry, dimensions, and material. For instance, the link members 121, 122 each have a same length between distal ends, and a distance between respective pivot points of the rotatable connectors 131, 141 on the link member 121 is also the same as a corresponding distance between respective pivot points of the rotatable connectors 132, 142 on the link member 122. The link members 121, 122 can be embodied from or include various materials such as, but not limited to, one or more metals (e.g., aluminum, carbon steel), alloys, polymers, composites, another material, or any combination thereof in many examples.

Individual component attributes and parameters of the mounting system 120 can be selected for different applications of the damper 100. For instance, individual component attributes and parameters of the mounting system 120 can be selected such that the ICR 161 and the axial force $F_{161}$ are formed and applied at a certain location on or approximately on the longitudinal centerline $\mathcal{C}$ of the housing 110 for a particular application of the damper 100. For example, individual component attributes and parameters of one or more of the housing 110, the housing mounts 111, 112, the link members 121, 122, the rotatable connectors 131, 132, 141, 142, or another component of the damper 100 can be selected such that the ICR 161 and the axial force $F_{161}$ are formed and applied at a certain location relative to the longitudinal centerline $\mathcal{C}$ of the housing 110 for a particular application of the damper 100. These individual component attributes and parameters of the damper 100 can also be selected such that the longitudinal centerlines $\mathcal{C}_{121}$, $\mathcal{C}_{122}$ of the link members 121, 122 intersect one another at a certain intersect angle $\theta_1$ at a particular location on or approximately on or close to the longitudinal centerline $\mathcal{C}$ of the housing 110 to form and apply the ICR 161 and the axial force $F_{161}$ at such a location for a specific application of the damper 100. In many examples, a distance between respective pivot points of the rotatable connectors 131, 141 on the link member 121 and a corresponding distance between respective pivot points of the rotatable connectors 132, 142 on the link member 122 can be specifically selected for each of a variety of different applications of the housing 110.

Figures 2A, 2B:
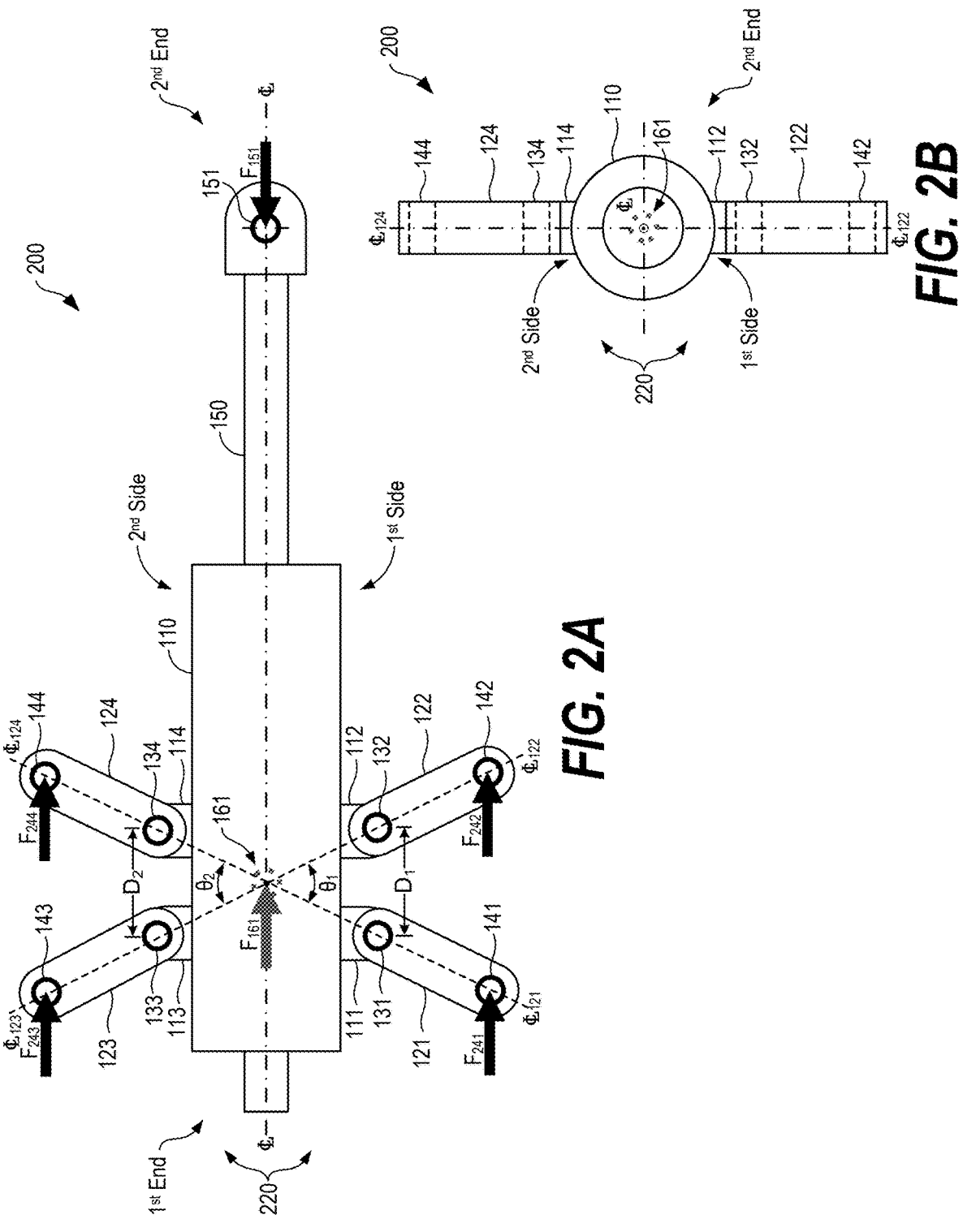
FIG. 2A illustrates a front view of another example damper in accordance with various aspects and embodiments of the present disclosure.
FIG. 2B illustrates a side view of the example damper shown in FIG. 2A in accordance with various aspects and embodiments of the present disclosure.

FIGS. 2A-2B illustrate different views of another example damper 200 in accordance with various aspects and embodiments of the present disclosure. FIG. 2A illustrates a front view of the damper 200 and FIG. 2B illustrates a side view of the damper 200. The damper 200 is an alternative example embodiment of the damper 100 described herein and illustrated in FIGS. 1A-1B. The damper 200 includes the same or similar components, attributes, features, and functional ability as that of the damper 100.

The damper 200 is illustrated as another representative example of a steering damper including a rotatable mounting system rotatably coupled to a housing of the damper 200 to reduce or eliminate side loading, friction, and overloading on various components of the damper 200. The concepts described herein can be extended to use with a range of dampers and rotatable mounting systems of different types, styles, components, and configurations, however. The damper 200 is not drawn to any particular scale or size in the drawings. The shape, size, proportion, and other characteristics of the damper 200 can vary as compared to that shown. For example, the damper 200 can accommodate larger (e.g., longer, thicker, wider) or smaller (e.g., shorter, thinner, narrower) rotatable link members forming the rotatable mounting system rotatably coupled to the housing of the damper 200, and other variations are within the scope of the examples described herein. The damper 200 is illustrated in FIGS. 2A-2B to exemplify an alternative embodiment of the damper 100 that includes more than two link members such as three, four, or more link members rotatably coupled at different radial locations about its housing and at different longitudinal locations along a length of its housing. Depending on various factors such as the type of rotatable connectors selected and the number and locations of link members coupled to the housing, the damper 200 may be over constrained in some applications but exhibit improved performance in other applications compared to existing mounting systems.

Additionally, one or more of the parts or components of the damper 200, as illustrated in the drawings and described herein, can be omitted in some cases. The damper 200 can also include other parts or components that are not illustrated. In many cases, the rotatable mounting system of the damper 200 can be rotatably coupled to one or more relatively rigid or static structures or members (not illustrated) such as at least one frame or mount member of a vehicle chassis. For instance, the rotatable mounting system of the damper 200 can be rotatably coupled to such one or more structures or members to implement the damper 200 as described in one or more examples herein.

The damper 200 can be embodied and implemented in many cases as a steering damper including a rotatable mounting system rotatably coupled to a housing of the damper 200 to reduce or eliminate side loading, friction, and overloading on various components of the damper 200. For instance, the damper 200 can be embodied and implemented in many cases as a steering damper having a rotatable mounting system the includes at least two links rotatably coupled to one or more sides of a housing of the damper 200.

The links can collectively create an instantaneous center of rotation for the damper's housing at a defined location on a longitudinal centerline of the housing to align axial loads applied to the damper 200 with the longitudinal centerline of its housing when such loads are applied to the damper 200 as described further herein. By aligning axial loads applied to the damper 200 along the longitudinal centerline of its housing, the links can minimize or eliminate any bending load on various components of the damper 200 during operation, thereby reducing friction between and overloading of these components and improving the overall performance and longevity of the damper 200.

Among other components, the damper 200 in the example shown includes the housing 110 and the housing mounts 111, 112 extending from the $1^{st}$ Side of the housing 110. The damper 200 also includes a third housing mount 113 and a fourth housing mount 114 extending from a second side ($2^{nd}$ Side) of the housing 110 that is opposite from (e.g., 180 degrees (°) from) the $1^{st}$ Side of the housing 110 in this example. The damper 200 further includes a mounting system 220 rotatably coupled to the housing mounts 111, 112, 113, 114 of the housing 110, as well as the shaft 150 concentrically positioned and movable within the housing 110 and the rotatable connector 151 located on the shaft 150 at the $2^{nd}$ End of the damper 200 as shown.

Similar to the housing mounts 111, 112, one or both of the housing mounts 113, 114 can be formed into (e.g., integrated into) or otherwise coupled to the $2^{nd}$ Side of the housing 110. For instance, one or both of the housing mounts 113, 114 can be an integral component of the housing 110, machined into the housing 110, welded to the housing 110, fastened to the housing 110, or otherwise secured to the housing 110 in various cases. In some examples, any or all of the housing mounts 111, 112, 113, 114 (or "housing mounts 111-114") may be a component that is embodied with or included in the mounting system 220. For instance, the mounting system 220 may be embodied as a modular unit that includes any or all of the housing mounts 111-114 for mounting such a unit to the housing 110 in some cases.

The housing mounts 111, 112 and the housing mounts 113, 114 extend from opposite sides of the housing 110 relative to the longitudinal centerline ℄ of the housing 110 in this example. For instance, the housing mounts 111, 112 each extend from the $1^{st}$ Side of the housing 110 and the housing mounts 113, 114 each extend from the $2^{nd}$ Side of the housing 110, which is opposite the $1^{st}$ Side relative to the longitudinal centerline ℄ of the housing 110.

The housing mounts 111, 112 extend from the housing 110 at corresponding first and second longitudinal locations relative to the longitudinal centerline ℄ of the housing 110 in this example. The first and second longitudinal locations are different and separated by the linear distance $D_1$ relative to the longitudinal centerline ℄ of the housing 110 as illustrated in this example.

Each of the housing mounts 113, 114 also extends from the housing 110 at a different defined longitudinal location relative to the longitudinal centerline ℄ of the housing 110 in this example. The housing mount 113 extends from the housing 110 at a third longitudinal location relative to the longitudinal centerline ℄ of the housing 110 and the housing mount 114 extends from the housing 110 at a fourth longitudinal location relative to the longitudinal centerline ℄ of the housing 110. The third and fourth longitudinal locations are different and separated by a linear distance ($D_2$) relative to the longitudinal centerline ℄ of the housing 110 as illustrated in this example.

In some examples, the linear distance $D_1$ separating longitudinal locations where the housing mounts 111, 112 extend from the housing 110 can be the same as (e.g., equal to) the linear distance $D_2$ separating the longitudinal locations where the housing mounts 113, 114 extend from the housing 110. In other examples, the linear distance $D_1$ separating the longitudinal locations where the housing mounts 111, 112 extend from the housing 110 can be different from (e.g., not equal to) the linear distance $D_2$ separating the longitudinal locations where the housing mounts 113, 114 extend from the housing 110. Also, the longitudinal locations where the housing mounts 111, 113 extend from the housing 110 can be the same in some cases or different in others. Similarly, the longitudinal locations where the housing mounts 112, 114 extend from the housing 110 can be the same in some cases and different in others.

The mounting system 220 can include at least two link members rotatably coupled to one or more sides of the housing 110 in many examples. In the example shown, the mounting system 220 includes the link members 121, 122 rotatably coupled to the housing mounts 111, 112, respectively, on the $1^{st}$ Side of the housing 110. The mounting system 220 in this example also includes a third link member 123 and a fourth link member 124 (or "link members 123, 124") rotatably coupled to the housing mounts 113, 114, respectively. The link members 123, 124 can each include at least one rotatable connector located at one or more of its ends. For instance, the link members 123, 124 can each include at least one rotatable connector coupled to or integrated into one or more of its ends. In this example, each of the link members 123, 124 includes a rotatable connector located at each of its distal ends. For instance, the link member 123 includes a first rotatable connector 133 and a second rotatable connector 143 located approximately at or adjacent its distal ends and the link member 124 includes a first rotatable connector 134 and a second rotatable connector 144 located approximately at or adjacent its distal ends as shown. In some examples, one or more of the rotatable connectors 133, 134, 143, 144 can be embodied as a rotational bearing, a bushing, a rubber bushing, a spherical ball joint, a ball bearing, or any other bearing that can only rotate in one plane (e.g., single degree-of-freedom). When the damper 200 is fabricated with four link members 121, 122, 123, 124 as illustrated in FIGS. 2A-2B, each of the rotatable connectors 131-134 and 141-144 can be embodied as a bearing rotatable only in one plane to control rotation of the housing 110. In another example or application of the damper 200, one or more of the rotatable connectors 131-134 and 141-144 may be embodied as a ball joint or other rotatable connector that can rotate within and across multiple planes. All embodiment variations of the damper 200 described herein are envisioned and included within the scope of the present disclosure.

Although not illustrated, in many cases the mounting system 220 can be rotatably coupled to one or more relatively rigid or static structures or members such as one or more frame or mount members of a vehicle chassis in many cases. For instance, the rotatable connectors 141, 142 of the link members 121, 122, respectively, and the rotatable connectors 143, 144 of the link members 123, 124, respectively, can be rotatably coupled to such one or more structures or members.

The link members 121, 122 and the link members 123, 124 are rotatably coupled to opposite sides of the housing 110 relative to the longitudinal centerline ℄ of the housing 110 in this example. For instance, the link members 121, 122 are each rotatably coupled to the $1^{st}$ Side of the housing 110 and the link members 123, 124 are each rotatably coupled to the $2^{nd}$ Side of the housing 110, which is opposite the $1^{st}$ Side relative to the longitudinal centerline $\mathcal{C}_L$ of the housing 110.

The link members 121, 122 are rotatably coupled (e.g., via the rotatable connectors 131, 132) to their respective housing mounts 111, 112 at corresponding first and second longitudinal locations relative to the longitudinal centerline $\mathcal{C}_L$ of the housing 110 in this example. The first and second longitudinal locations are different and separated by the linear distance $D_1$ relative to the longitudinal centerline $\mathcal{C}_L$ of the housing 110 as illustrated in this example.

Each of the link members 123, 124 is also rotatably coupled to the housing 110 at a different defined longitudinal location relative to the longitudinal centerline $\mathcal{C}_L$ of the housing 110 in this example. The rotatable connector 133 of the link member 123 is rotatably coupled to the housing mount 113 at a third longitudinal location relative to the longitudinal centerline $\mathcal{C}_L$ of the housing 110 and the rotatable connector 134 of the link member 124 is rotatably coupled to the housing mount 114 at a fourth longitudinal location relative to the longitudinal centerline $\mathcal{C}_L$ of the housing 110. The third and fourth longitudinal locations are different and separated by the linear distance $D_2$ relative to the longitudinal centerline $\mathcal{C}_L$ of the housing 110 as illustrated in this example.

The link members 121, 122, 123, 124 (or "link members 121-124") are each rotatable within a single or same plane relative to one another in this example. For instance, the rotatable connectors 131, 132, 133, 134 (or "rotatable connectors 131-134") of the link members 121-124, respectively, can each be embodied as or include a ball bearing that is rotatably coupled to the housing mounts 111, 112, 113, 114 (or "housing mounts 111-114"), respectively, of the housing 110. The ball bearings can allow for single plane or same plane rotation of their corresponding link members 121-124 relative to one another about respective pivot points of the ball bearings. For example, the ball bearings can allow for rotation of their corresponding link members 121-124 about respective pivot points of the ball bearings and within a plane shared by each of the longitudinal centerline $\mathcal{C}_L$ of the housing 110, the longitudinal centerline $\mathcal{C}_{L121}$ of the link member 121, the longitudinal centerline $\mathcal{C}_{L122}$ of the link member 122, a longitudinal centerline $\mathcal{C}_{L123}$ of the link member 123, and a longitudinal centerline $\mathcal{C}_{L124}$ of the link member 124.

In some examples, any or all of the link members 121-124 can be rotatable within and across multiple or different planes relative to another link member. For instance, any or all of the rotatable connectors 131-134 of the link members 121-124, respectively, can be embodied as or include a ball joint that is rotatably coupled to the housing mounts 111-114, respectively, of the housing 110 in some cases. The ball joints can allow for rotation of their corresponding link members 121-124 relative to one another about respective pivot points of the ball joints. For example, the ball joints can allow for rotation of their corresponding rotatable connectors 131-134 about respective pivot points of the ball joints, as well as across and within one or more planes shared by the longitudinal centerline $\mathcal{C}_L$ of the housing 110 and at least one of the longitudinal centerline $\mathcal{C}_{L121}$ of the link member 121, the longitudinal centerline $\mathcal{C}_{L122}$ of the link member 122, the longitudinal centerline $\mathcal{C}_{L123}$ of the link member 123, or the longitudinal centerline $\mathcal{C}_{L124}$ of the link member 124.

Similar to the longitudinal centerlines $\mathcal{C}_{L121}$, $\mathcal{C}_{L122}$ of the link members 121, 122, respectively, the longitudinal centerline $\mathcal{C}_{L123}$ of the link member 123 and the longitudinal centerline $\mathcal{C}_{L124}$ of the link member 124 can intersect one another at a defined intersect angle ($\theta_2$) at a certain location on the longitudinal centerline $\mathcal{C}_L$ of the housing 110. For instance, whether the damper 200 is in an operating mode or a non-operating mode, the link members 123, 124 can be positioned or rotated about the housing mounts 113, 114, respectively, such that their respective longitudinal centerlines $\mathcal{C}_{L123}$, $\mathcal{C}_{L124}$ intersect one another at an intersect angle $\theta_2$ at a certain location on the longitudinal centerline $\mathcal{C}_L$ of the housing 110. In the example shown, the link members 123, 124 can be positioned or rotated such that their respective longitudinal centerlines $\mathcal{C}_{L123}$, $\mathcal{C}_{L124}$ intersect one another at the intersect angle $\theta_2$ at some location on the longitudinal centerline $\mathcal{C}_L$ of the housing 110 to at least partly create the ICR 161 for the housing 110 together at such a location on the longitudinal centerline $\mathcal{C}_L$ of the housing 110. In this example, the link members 123, 124 and the link members 121, 122 can collectively create the ICR 161 for the housing 110. For instance, the link members 121-124 can all be positioned or rotated such that their respective longitudinal centerlines $\mathcal{C}_{L121}$-$\mathcal{C}_{L124}$ intersect one another at some location on the longitudinal centerline $\mathcal{C}_L$ of the housing 110 to collectively create the ICR 161 for the housing 110 at such a location on the longitudinal centerline $\mathcal{C}_L$ of the housing 110.

The ICR 161 in the example shown in FIGS. 2A-2B can be designed, embodied, and implemented as a virtual pivoting point that can be created during operation of the damper 200 on or close to the longitudinal centerline $\mathcal{C}_L$ of the housing 110. The link members 121-124 can create the ICR 161 during operation of the damper 200 to align the longitudinal centerline $\mathcal{C}_L$ of the housing 110 with both the axial force $F_{151}$ applied to the rotatable connector 151 and the axial force $F_{161}$ that can be functionally or effectively formed and applied at the ICR 161 by way of the link members 121-124 as shown in this example. For instance, the link members 121-124 can create the ICR 161 during operation of the damper 200 to functionally or effectively transfer an offset force ($F_{241}$) applied to the rotatable connector 141, an offset force ($F_{242}$) applied to the rotatable connector 142, an offset force ($F_{243}$) applied to the rotatable connector 143, and an offset force ($F_{244}$) applied to the rotatable connector 144 to the longitudinal centerline $\mathcal{C}_L$ of the housing 110 and further combine such offset forces $F_{241}$, $F_{242}$, $F_{243}$, $F_{244}$ to form and apply the axial force $F_{161}$ at the ICR 161 as shown. By aligning the offset forces $F_{241}$-$F_{244}$ along the longitudinal centerline $\mathcal{C}_L$ of the housing 110 to form and apply the axial force $F_{161}$ at the ICR 161, the link members 121-124 can collectively minimize or eliminate any bending load on various components of the damper 200 during operation, thereby reducing friction between and overloading of these components and improving the overall performance and longevity of the damper 200. The ICR 161 can allow the damper 200 to function as if the rotatable connector 151 was located inside the housing 110, thereby significantly reducing or eliminating any bending torque on the shaft 150 and other components of the damper 200 compared to existing steering dampers.

The link members 121-124 can be embodied such that they each have the same or similar geometry, dimensions, and material in many examples. In some cases, one of the link members 121-124 can be embodied such that it has at least one of a different geometry, dimension, or material relative to the other link member. In the example shown, each of the link members 121-124 have the same or similar geometry, dimensions, and material. For instance, the link members 121-124 each have a same length between distal ends, and a distance between respective pivot points of the rotatable connectors on each of the link members 121-124 is also the same. Individual link members among the link members 121-124 can be embodied from or include various materials such as, but not limited to, one or more metals (e.g., aluminum, carbon steel), alloys, polymers, composites, another material, or any combination thereof.

Individual component attributes and parameters of the mounting system 220 can be selected for different applications of the damper 200. For instance, individual component attributes and parameters of the mounting system 220 can be selected such that the ICR 161 and the axial force $F_{161}$ are formed and applied at a certain location on or approximately on the longitudinal centerline $\mathcal{C}$ of the housing 110 for a particular application of the damper 200. For example, individual component attributes and parameters of one or more of the housing 110, the housing mounts 111-114, the link members 121-124, the rotatable connectors 131-134, the rotatable connectors 141-144, or another component of the damper 200 can be selected such that the ICR 161 and the axial force $F_{161}$ are formed and applied at a certain location relative to the longitudinal centerline $\mathcal{C}$ of the housing 110 for a particular application of the damper 200. These individual component attributes and parameters of the damper 200 can also be selected such that the longitudinal centerlines $\mathcal{C}_{121}$-$\mathcal{C}_{124}$ of the link members 121-124 intersect one another at a particular location on or approximately on the longitudinal centerline $\mathcal{C}$ of the housing 110 to form and apply the ICR 161 and the axial force $F_{161}$ at such a location for a specific application of the damper 200. In many examples, distances between respective pivot points of the rotatable connectors on the link members 121-124 can be specifically selected for each of a variety of different applications of the housing 110. For instance, a distance between respective pivot points of the rotatable connectors 131, 141 on the link member 121, a corresponding distance between respective pivot points of the rotatable connectors 132, 142 on the link member 122, a corresponding distance between respective pivot points of the rotatable connectors 133, 143 on the link member 123, and a corresponding distance between respective pivot points of the rotatable connectors 134, 144 on the link member 124 can be specifically selected for each of a variety of different applications of the housing 110.

In some examples, one of the housing mounts 111, 112 and its corresponding link member 121, 122 and one of the housing mounts 113, 114 and its corresponding link member 123, 124 may be omitted from the damper 200 to form an alternative example embodiment of the damper 100. For instance, the housing mounts 111, 113 and their corresponding link members 121, 123 may be omitted from the damper 200 in some cases. In another example, the housing mounts 112, 114 and their corresponding link members 122, 124 may be omitted from the damper 200. In yet another example, the housing mounts 111, 114 and their corresponding link members 121, 124 may be omitted from the damper 200. In still another example, the housing mounts 112, 113 and their corresponding link members 122, 123 may be omitted from the damper 200.

In other examples, either of the mounting systems 120, 220 described herein can include one or more additional link members rotatably coupled to the housing 110 to create further geometrical control of the damper 100, 200, respectively. An example of such a mounting system is described below with reference to FIGS. 3A-3B.

Figures 3A, 3B:
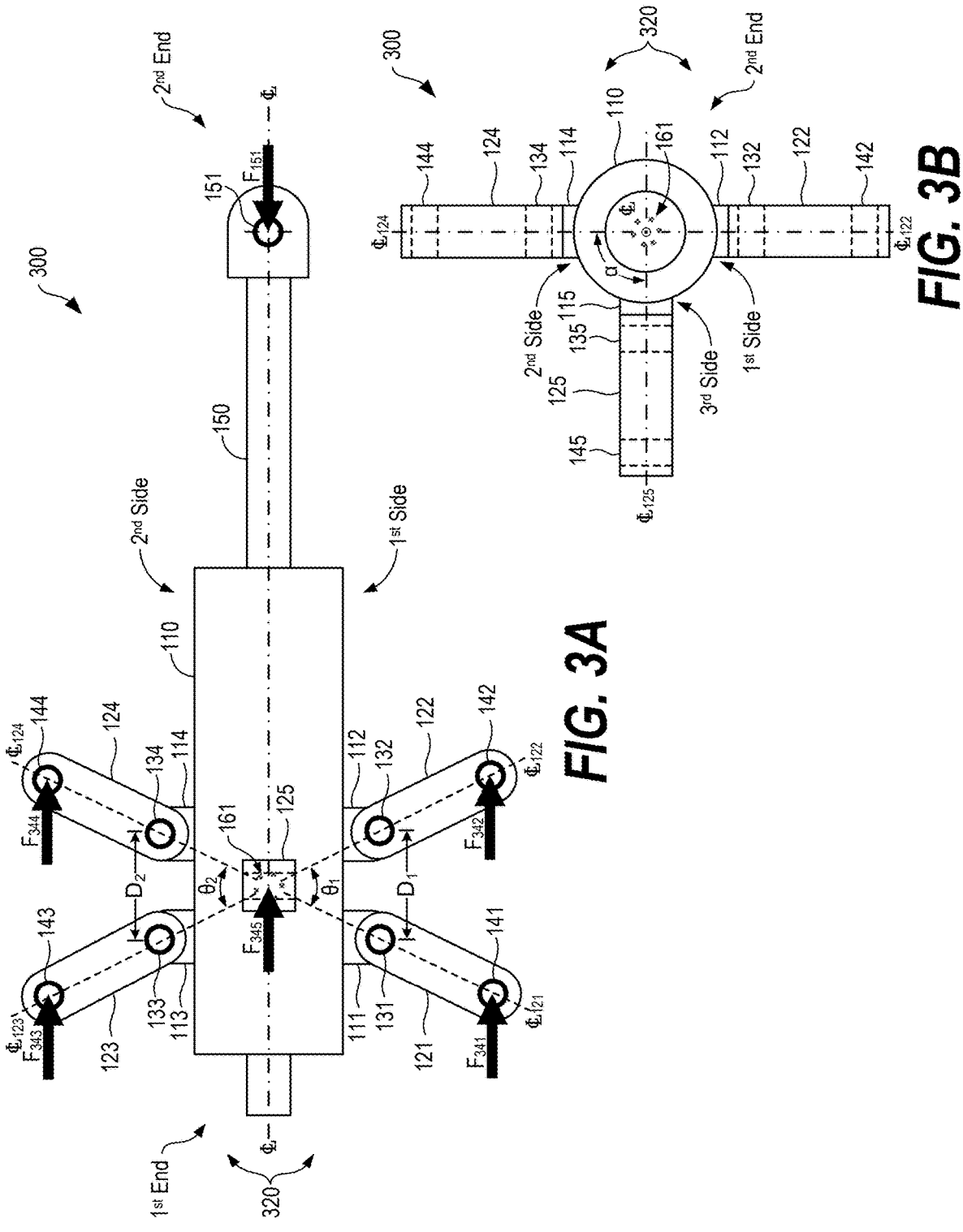
FIG. 3A illustrates a front view of another example damper in accordance with various aspects and embodiments of the present disclosure.
FIG. 3B illustrates a side view of the example damper shown in FIG. 3A in accordance with various aspects and embodiments of the present disclosure.

FIGS. 3A-3B illustrate different views of another example damper 300 in accordance with various aspects and embodiments of the present disclosure. FIG. 3A illustrates a front view of the damper 300 and FIG. 3B illustrates a side view of the damper 300. The damper 300 is an alternative example embodiment of each of the dampers 100, 200 described herein and illustrated in FIGS. 1A-2B. The damper 300 includes the same or similar components, attributes, features, and functional ability as that of each of the dampers 100, 200.

The damper 300 is illustrated as another representative example of a steering damper including a rotatable mounting system rotatably coupled to a housing of the damper 300 to reduce or eliminate side loading, friction, and overloading on various components of the damper 300. The concepts described herein can be extended to use with a range of dampers and rotatable mounting systems of different types, styles, components, and configurations, however. The damper 300 is not drawn to any particular scale or size in the drawings. The shape, size, proportion, and other characteristics of the damper 300 can vary as compared to that shown. For example, the damper 300 can accommodate larger (e.g., longer, thicker, wider) or smaller (e.g., shorter, thinner, narrower) rotatable link members forming the rotatable mounting system rotatably coupled to the housing of the damper 300, and other variations are within the scope of the examples described herein. The damper 300 is illustrated in FIGS. 3A-3B to exemplify another alternative embodiment of the damper 100 that includes more than two link members such as three, four, five, or more link members rotatably coupled at different radial locations about its housing and at different longitudinal locations along a length of its housing. Depending on various factors such as the type of rotatable connectors selected and the number and locations of link members coupled to the housing, the damper 300 may be over constrained in some applications but exhibit improved performance in other applications compared to existing mounting systems.

Additionally, one or more of the parts or components of the damper 300, as illustrated in the drawings and described herein, can be omitted in some cases. The damper 300 can also include other parts or components that are not illustrated. In many cases, the rotatable mounting system of the damper 300 can be rotatably coupled to one or more relatively rigid or static structures or members (not illustrated) such as at least one frame or mount member of a vehicle chassis. For instance, the rotatable mounting system of the damper 300 can be rotatably coupled to such one or more structures or members to implement the damper 300 as described in one or more examples herein.

The damper 300 can be embodied and implemented in many cases as a steering damper including a rotatable mounting system rotatably coupled to a housing of the damper 300 to reduce or eliminate side loading, friction, and overloading on various components of the damper 300. For instance, the damper 300 can be embodied and implemented in many cases as a steering damper having a rotatable mounting system the includes at least two links rotatably coupled to one or more sides of a housing of the damper 300. The links can collectively create an instantaneous center of rotation for the damper's housing at a defined location on a longitudinal centerline of the housing to align axial loads applied to the damper 300 with the longitudinal centerline of its housing when such loads are applied to the damper 300 as described further herein. By aligning axial loads applied to the damper 300 along the longitudinal centerline of its housing, the links can minimize or eliminate any bending load on various components of the damper 300 during operation, thereby reducing friction between and overloading of these components and improving the overall performance and longevity of the damper 300.

Among other components, the damper 300 in the example shown includes the housing 110 and the housing mounts 111-114 extending from the 1$^{st}$ Side and the 2$^{nd}$ Side of the housing 110. The damper 300 also includes a fifth housing mount 115 extending from a third side (3$^{rd}$ Side) of the housing 110 that is perpendicular to or angularly offset from (e.g., 90° from) each of the 1$^{st}$ Side and the 2$^{nd}$ Side of the housing 110 relative to (e.g., about) the longitudinal centerline ₵ of the housing 110 in this example. The damper 300 further includes a mounting system 320 rotatably coupled to the housing mounts 111, 112, 113, 114, 115 of the housing 110, as well as the shaft 150 concentrically positioned and movable within the housing 110 and the rotatable connector 151 located on the shaft 150 at the 2$^{nd}$ End of the damper 300 as shown.

Similar to the housing mounts 111-114, the housing mount 115 can be formed into (e.g., integrated into) or otherwise coupled to the 3$^{rd}$ Side of the housing 110. For instance, the housing mount 115 can be an integral component of the housing 110, machined into the housing 110, welded to the housing 110, fastened to the housing 110, or otherwise secured to the housing 110 in various cases. In some examples, any or all of housing mounts 111, 112, 113, 114, 115 (or "housing mounts 111-115") may be a component that is embodied with or included in the mounting system 320. For instance, the mounting system 320 may be embodied as a modular unit that includes any or all of the housing mounts 111-115 for mounting such a unit to the housing 110 in some cases.

The housing mounts 111-114 extend from opposite sides of the housing 110 relative to the longitudinal centerline ₵ of the housing 110 as described herein with reference to the example shown in FIGS. 2A-2B. The housing mounts 111-114 also extend from the housing 110 at certain longitudinal locations relative to the longitudinal centerline ₵ of the housing 110 as described herein with reference to the example shown in FIGS. 2A-2B.

Similar to the housing mounts 111-114, the housing mount 115 extends from the housing 110 at a defined longitudinal location relative to the longitudinal centerline ₵ of the housing 110 in this example. For instance, the housing mount 115 extends from the housing 110 at a fifth longitudinal location relative to the longitudinal centerline ₵ of the housing 110. The fifth longitudinal location of the housing mount 115 can be different from each of the longitudinal locations where the housing mounts 111-114 extend from the housing 110 in many cases. For instance, the fifth longitudinal location of the housing mount 115 can be located approximately halfway between the longitudinal location where the housing mounts 111, 113 extend from the housing 110 and the longitudinal location where the housing mounts 112, 114 extend from the housing 110.

The mounting system 320 can include at least two link members rotatably coupled to one or more sides of the housing 110 in many examples. In addition to the link members 121-124 rotatably coupled to their corresponding housing mounts 111-114 as described with reference to FIGS. 2A-2B, the mounting system 320 in this example also includes a fifth link member 125 rotatably coupled to the housing mount 115. The link member 125 includes at least one rotatable connector located at one or more of its ends. For instance, the link member 125 includes at least one rotatable connector coupled to or integrated into one or more of its ends. In this example, the link member 125 includes a rotatable connector located at each of its distal ends. For instance, the link member 125 includes a first rotatable connector 135 and a second rotatable connector 145 located approximately at or adjacent its distal ends as shown. In some examples, one or both of the rotatable connectors 135, 145 can be embodied as a ball bearing or other rotatable connector that is configured and operable for rotation within a single plane. In other examples, one or both of the rotatable connectors 135, 145 can be embodied as a ball joint or other rotatable connector that is configured and operable for rotation within and across multiple planes. In the example shown, each of the rotatable connectors 135, 145 is embodied as a ball bearing.

Although not illustrated, in many cases the mounting system 320 can be rotatably coupled to one or more relatively rigid or static structures or members such as one or more frame or mount members of a vehicle chassis in many cases. For instance, the rotatable connectors 141, 142 of the link members 121, 122, respectively, along with the rotatable connectors 143, 144 of the link members 123, 124, respectively, and the rotatable connector 145 of the link member 125 can be rotatably coupled to such one or more structures or members.

The link members 121-124 are rotatably coupled to opposite sides of the housing 110 relative to the longitudinal centerline 4 of the housing 110 as described herein with reference to the example shown in FIGS. 2A-2B. The link members 121-124 are also rotatably coupled (e.g., via the rotatable connectors 131-134) to their respective housing mounts 111-114 at corresponding first, second, third, and fourth longitudinal locations relative to the longitudinal centerline ₵ of the housing 110 as described herein with reference to the example shown in FIGS. 2A-2B.

The link member 125 can be rotatably coupled to a side of the housing 110 that is angularly offset by a defined angle (α) from one or both of the 1$^{st}$ and 2$^{nd}$ Sides of the housing 110 relative to (e.g., about) the longitudinal centerline ₵ of the housing 110 in many cases. In the example shown, the rotatable connector 135 of the link member 125 is rotatably coupled to the housing mount 115 extending from the 3$^{rd}$ Side of the housing 110, which is angularly offset by an angle α from each of the 1$^{st}$ and 2$^{nd}$ Sides of the housing 110 relative to the longitudinal centerline ₵ of the housing 110. In this example, the rotatable connector 135 of the link member 125 is rotatably coupled to the housing mount 115 extending from the 3$^{rd}$ Side of the housing 110, which is angularly offset by an angle α of approximately 90° from each of the 1$^{st}$ and 2$^{nd}$ Sides of the housing 110 relative to the longitudinal centerline ₵ of the housing 110.

Similar to the link members 121-124, the link member 125 is also rotatably coupled to the housing 110 at a defined longitudinal location relative to the longitudinal centerline ₵ of the housing 110 in this example. The rotatable connector 135 of the link member 125 is rotatably coupled to the housing mount 115 at a fifth longitudinal location relative to the longitudinal centerline ₵ of the housing 110 in this example. The fifth longitudinal location where the rotatable connector 135 of the link member 125 is rotatably coupled to the housing mount 115 can be different from each of the longitudinal locations where the rotatable connectors 131-134 of the link members 121-124, respectively, are rotatably coupled to their corresponding housing mounts 111-114. In this example, the fifth longitudinal location where the rotatable connector 135 of the link member 125 is rotatably coupled to the housing mount 115 is located approximately halfway between the longitudinal location where the rotatable connectors 131, 133 of the link members 121, 123, respectively, are rotatably coupled to their corresponding housing mounts 111, 113 and the longitudinal location where the rotatable connectors 132, 134 of the link members 122, 124, respectively, are rotatably coupled to their corresponding housing mounts 112, 114. The link members 121-125 can be located where it's suitable to attach to a frame of a vehicle in many examples and at the same time the locations about and along the housing 110 and angles of such members can define the resulting load in each component. In some cases, compromises may be involved in the design of the damper 300.

The link members 121, 122, 123, 124, 125 (or "link members 121-125") are each rotatable within a single or same plane in this example. For instance, the rotatable connectors 131, 132, 133, 134, 135 (or "rotatable connectors 131-135") of the link members 121-125, respectively, can each be embodied as or include a ball bearing that is rotatably coupled to the housing mounts 111, 112, 113, 114, 115 (or "housing mounts 111-115"), respectively, of the housing 110. The ball bearings can allow for single plane or same plane rotation of their corresponding link members 121-125 about respective pivot points of the ball bearings.

The link members 121-124 are each rotatable within a first single or same plane in the example shown and the link member 125 is rotatable within a second single or same plane. The second single or same plane can be angularly offset from the first single or same plane by a defined angle $\alpha$ relative to (e.g., about) the longitudinal centerline $\mathcal{C}$ of the housing 110 in many cases. In this example, the second single or same plane is approximately perpendicular to or angularly offset from the first single or same plane by a defined angle $\alpha$ of approximately 90° relative to the longitudinal centerline $\mathcal{C}$ of the housing 110.

In the example shown, the rotatable connectors 131-134 can allow for rotation of their corresponding link members 121-124 about respective pivot points of the rotatable connectors and within a plane shared by the longitudinal centerline $\mathcal{C}$ of the housing 110 and each of the longitudinal centerlines $\mathcal{C}_{121}$-$\mathcal{C}_{124}$ of the link members 121-124, respectively. In this example, the rotatable connector 135 can allow for rotation of the link member 125 about a pivot point of the rotatable connector 135 and within a plane shared by the longitudinal centerline $\mathcal{C}$ of the housing 110 and a longitudinal centerline $\mathcal{C}$125 of the link member 125.

In some examples, any or all of the link members 121-125 can be rotatable within and across multiple or different planes. For instance, any or all of the rotatable connectors 131-135 of the link members 121-125, respectively, can be embodied as or include a ball joint that is rotatably coupled to the housing mounts 111-115, respectively, of the housing 110 in some cases. The ball joints can allow for rotation of their corresponding link members 121-125 relative to one another about respective pivot points of the ball joints. For example, the ball joints can allow for rotation of their corresponding rotatable connectors 131-135 about respective pivot points of the ball joints, as well as across and within one or more planes shared by the longitudinal centerline $\mathcal{C}$ of the housing 110 and at least one of the longitudinal centerlines $\mathcal{C}_{121}$-$\mathcal{C}_{125}$ of the link members 121-125.

The longitudinal centerlines $\mathcal{C}_{121}$-$\mathcal{C}_{124}$ of the link members 121-124 intersect one another at a certain location on the longitudinal centerline $\mathcal{C}$ of the housing 110 to at least partly create the ICR 161 as described herein with reference to the example shown in FIGS. 2A-2B. The longitudinal centerline $\mathcal{C}_{125}$ of the link member 125 can also intersect each of the longitudinal centerlines $\mathcal{C}_{121}$-$\mathcal{C}_{124}$ of the link members 121-124 at such a location at an angle $\alpha$ relative to (e.g., about) the longitudinal centerline $\mathcal{C}$ of the housing 110 to at least partly create the ICR 161. In the example shown, the longitudinal centerline $\mathcal{C}_{125}$ of the link member 125 intersects each of the longitudinal centerlines $\mathcal{C}_{121}$-$\mathcal{C}_{124}$ of the link members 121-124 at such a location at an angle $\alpha$ of approximately 90° relative to the longitudinal centerline $\mathcal{C}$ of the housing 110 to at least partly create the ICR 161. The longitudinal centerline $\mathcal{C}_{125}$ of the link member 125 can intersect the longitudinal centerlines $\mathcal{C}_{121}$-$\mathcal{C}_{124}$ of the link members 121-124 as described to at least partly form the ICR 161 and further provide at least partial geometric stability in many cases to at least one of the mounting system 320 or the damper 300 during operation.

The ICR 161 in the example shown in FIGS. 3A-3B can be designed, embodied, and implemented as a virtual pivoting point that can be created during operation of the damper 300 on or close to the longitudinal centerline $\mathcal{C}$ of the housing 110. The link members 121-125 can create the ICR 161 during operation of the damper 300 to align the longitudinal centerline $\mathcal{C}$ of the housing 110 with both the axial force $F_{151}$ applied to the rotatable connector 151 and the axial force $F_{161}$ (FIG. 2A) that can be functionally or effectively formed and applied at the ICR 161 by way of the link members 121-125 in this example. For instance, the link members 121-125 can create the ICR 161 during operation of the damper 300 to functionally or effectively transfer offset forces $F_{341}$, $F_{342}$, $F_{343}$, $F_{344}$ applied to the rotatable connectors 141-144, respectively, and an offset force $F_{345}$ applied to the rotatable connector 145 to the longitudinal centerline $\mathcal{C}$ of the housing 110 and further combine such offset forces to form and apply the axial force $F_{161}$ (FIG. 2A) at the ICR 161. By aligning the offset forces $F_{341}$-$F_{345}$ along the longitudinal centerline $\mathcal{C}$ of the housing 110 to form and apply the axial force $F_{161}$ at the ICR 161, the link members 121-125 can collectively minimize or eliminate any bending load on various components of the damper 300 during operation, thereby reducing friction between and overloading of these components and improving the overall performance and longevity of the damper 300. The ICR 161 can allow the damper 300 to function as if the rotatable connector 151 was located inside the housing 110, thereby significantly reducing or eliminating any bending torque on the shaft 150 and other components of the damper 300 compared to existing steering dampers.

The link members 121-125 can be embodied such that they each have the same or similar geometry, dimensions, and material in many examples. In some cases, one of the link members 121-125 can be embodied such that it has at least one of a different geometry, dimension, or material relative to the other link member. In the example shown, each of the link members 121-125 have the same or similar geometry, dimensions, and material. For instance, the link members 121-125 each have a same length between distal ends, and a distance between respective pivot points of the rotatable connectors on each of the link members 121-125 is also the same. Individual link members among the link members 121-125 can be embodied from or include various materials such as, but not limited to, one or more metals (e.g., aluminum, carbon steel), alloys, polymers, composites, another material, or any combination thereof.

Individual component attributes and parameters of the mounting system 320 can be selected for different applications of the damper 300. For instance, individual component attributes and parameters of the mounting system 320 can be selected such that the ICR 161 and the axial force $F_{161}$ are formed and applied at a certain location on or approximately on the longitudinal centerline $\mathcal{C}$ of the housing 110 for a particular application of the damper 300. For example, individual component attributes and parameters of one or more of the housing 110, the housing mounts 111-115, the link members 121-125, the rotatable connectors 131-135, the rotatable connectors 141-145, or another component of the damper 300 can be selected such that the ICR 161 and the axial force $F_{161}$ are formed and applied at a certain location relative to the longitudinal centerline $\mathcal{C}$ of the housing 110 for a particular application of the damper 300. These individual component attributes and parameters of the damper 300 can also be selected such that the longitudinal centerlines $\mathcal{C}_{121}$-$\mathcal{C}_{125}$ of the link members 121-125 intersect one another at a particular location on or approximately on the longitudinal centerline $\mathcal{C}$ of the housing 110 to form and apply the ICR 161 and the axial force $F_{161}$ at such a location for a specific application of the damper 300. In many examples, distances between respective pivot points of the rotatable connectors on the link members 121-125 can be specifically selected for each of a variety of different applications of the housing 110. For instance, a distance between respective pivot points of the rotatable connectors 131, 141 on the link member 121, a corresponding distance between respective pivot points of the rotatable connectors 132, 142 on the link member 122, a corresponding distance between respective pivot points of the rotatable connectors 133, 143 on the link member 123, a corresponding distance between respective pivot points of the rotatable connectors 134, 144 on the link member 124, and a corresponding distance between respective pivot points of the rotatable connectors 135, 145 on the link member 125 can be specifically selected for each of a variety of different applications of the housing 110.

In some examples, one of the housing mounts 111, 112 and its corresponding link member 121, 122 and one of the housing mounts 113, 114 and its corresponding link member 123, 124 may be omitted from the damper 300 to form an alternative example embodiment of the damper 100. For instance, the housing mounts 111, 113 and their corresponding link members 121, 123 may be omitted from the damper 300 in some cases. In another example, the housing mounts 112, 114 and their corresponding link members 122, 124 may be omitted from the damper 300. In yet another example, the housing mounts 111, 114 and their corresponding link members 121, 124 may be omitted from the damper 300. In still another example, the housing mounts 112, 113 and their corresponding link members 122, 123 may be omitted from the damper 300.

In other examples, any of the mounting systems 120, 220, 320 described herein can include one or more additional link members rotatably coupled to the housing 110 to create further geometrical control of the damper 100, 200, 300, respectively.

The features, structures, or characteristics described above may be combined in one or more embodiments in any suitable manner, and the features discussed in the various embodiments are interchangeable, if possible. In the above description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included. The terms "about" and "substantially," unless otherwise defined herein to be associated with a particular range, percentage, or related metric of deviation, account for at least some manufacturing tolerances between a theoretical design and manufactured product or assembly, such as the geometric dimensioning and tolerancing criteria described in the American Society of Mechanical Engineers (ASME®) Y14.5 and the related International Organization for Standardization (ISO®) standards. Such manufacturing tolerances are still contemplated, as one of ordinary skill in the art would appreciate, although "about," "substantially," or related terms are not expressly referenced, even in connection with the use of theoretical terms, such as the geometric "perpendicular," "orthogonal," "vertex," "collinear," "coplanar," and other terms.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable. Further, if a component is described as there being "at least one" of said component, it is understood that this may mean "one or more" of said component. Conversely, if a component is described as there being "one or more" of said component, it is understood that this may mean "at least one" of said component.

As referenced herein in the context of quantity, the terms "a" or "an" are intended to mean "at least one" and are not intended to imply "one and only one." As referred to herein, the terms "include," "includes," and "including" are each intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling"

refer to chemical coupling (e.g., chemical bonding), communicative coupling, electrical and/or electromagnetic coupling (e.g., capacitive coupling, inductive coupling, direct and/or connected coupling), mechanical coupling, operative coupling, optical coupling, fluid coupling, thermal coupling, and/or physical coupling.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A steering damper, comprising:
a housing having a longitudinal centerline; and
a mounting system coupled to the housing, the mounting system comprising at least two link members rotatably coupled to the housing, the at least two link members comprising:
a first link member rotatably coupled to a first side of the housing relative to the longitudinal centerline of the housing; and
a second link member rotatably coupled to a second side of the housing that is opposite from the first side of the housing relative to the longitudinal centerline of the housing,
wherein longitudinal centerlines of the at least two link members intersect one another at a defined location on the longitudinal centerline of the housing, thereby defining an instantaneous center of rotation for the housing at the defined location.

2. The steering damper of claim 1, wherein:
the first link member is rotatably coupled to the first side of the housing at a first longitudinal location relative to the longitudinal centerline of the housing; and
the second link member is rotatably coupled to the second side of the housing at a second longitudinal location relative to the longitudinal centerline of the housing that is different from the first longitudinal location.

3. The steering damper of claim 1, wherein the longitudinal centerlines of the at least two link members intersect one another at a defined angle at the defined location on the longitudinal centerline of the housing, thereby defining the instantaneous center of rotation for the housing at the defined location.

4. The steering damper of claim 1, wherein the at least two link members each comprise a rotational bearing, a bushing, a rubber bushing, a ball bearing, or a spherical ball joint rotatably coupled to the housing.

5. The steering damper of claim 1, wherein the at least two link members each comprise a ball joint rotatably coupled to the housing.

6. The steering damper of claim 1, wherein:
the at least two link members each comprise a first end, a second end, a first rotatable connector at the first end, and a second rotatable connector at the second end; and
the first rotatable connector at the first end of each of the at least two link members is rotatably coupled to the housing.

7. The steering damper of claim 6, wherein at least one of the first rotatable connector or the second rotatable connector comprises a ball bearing.

8. The steering damper of claim 6, wherein at least one of the first rotatable connector or the second rotatable connector comprises a ball joint.

9. The steering damper of claim 1, wherein the at least two link members are rotatable within a single plane or a same plane relative to one another.

10. The steering damper of claim 1, wherein the at least two link members are rotatable within multiple planes or different planes relative to one another.

11. The steering damper of claim 1, further comprising: a shaft concentrically positioned at least partly within the housing and operable for translational movement along the longitudinal centerline of the housing.

12. A steering damper, comprising:
a housing having a longitudinal centerline; and
a mounting system coupled to the housing, the mounting system comprising at least two link members rotatably coupled to the housing,
wherein the at least two link members each comprise a ball joint rotatably coupled to the housing;
wherein longitudinal centerlines of the at least two link members intersect one another at a defined location on the longitudinal centerline of the housing, thereby defining an instantaneous center of rotation for the housing at the defined location.

13. The steering damper of claim 12, wherein the at least two link members are each rotatably coupled to a same side of the housing relative to the longitudinal centerline of the housing.

14. The steering damper of claim 12, wherein:
the first link member is rotatably coupled to the first side of the housing at a first longitudinal location relative to the longitudinal centerline of the housing; and
the second link member is rotatably coupled to the second side of the housing at a second longitudinal location relative to the longitudinal centerline of the housing that is different from the first longitudinal location.

15. The steering damper of claim 12, wherein the longitudinal centerlines of the at least two link members intersect one another at a defined angle at the defined location on the longitudinal centerline of the housing, thereby defining the instantaneous center of rotation for the housing at the defined location.

16. A steering damper, comprising:
a housing having a longitudinal centerline;
a mounting system coupled to the housing, the mounting system comprising at least two link members rotatably coupled to the housing,
wherein longitudinal centerlines of the at least two link members intersect one another at a defined location on the longitudinal centerline of the housing, thereby defining an instantaneous center of rotation for the housing at the defined location; and
a shaft concentrically positioned at least partly within the housing and operable for translational movement along the longitudinal centerline of the housing.

17. The steering damper of claim 16, wherein the at least two link members are each rotatably coupled to a same side of the housing relative to the longitudinal centerline of the housing.

18. The steering damper of claim 16, wherein the at least two link members comprise:
a first link member rotatably coupled to a first side of the housing relative to the longitudinal centerline of the housing; and a second link member rotatably coupled to a second side of the housing that is opposite from the first side of the housing relative to the longitudinal centerline of the housing.

19. The steering damper of claim 16, wherein the at least two link members each comprise a rotational bearing, a bushing, a rubber bushing, a ball bearing, or a spherical ball joint rotatably coupled to the housing.

20. The steering damper of claim 16, wherein:

the at least two link members each comprise a first end, a second end, a first rotatable connector at the first end, and a second rotatable connector at the second end; and the first rotatable connector at the first end of each of the at least two link members is rotatably coupled to the housing.

\* \* \* \* \*